Figure 1:
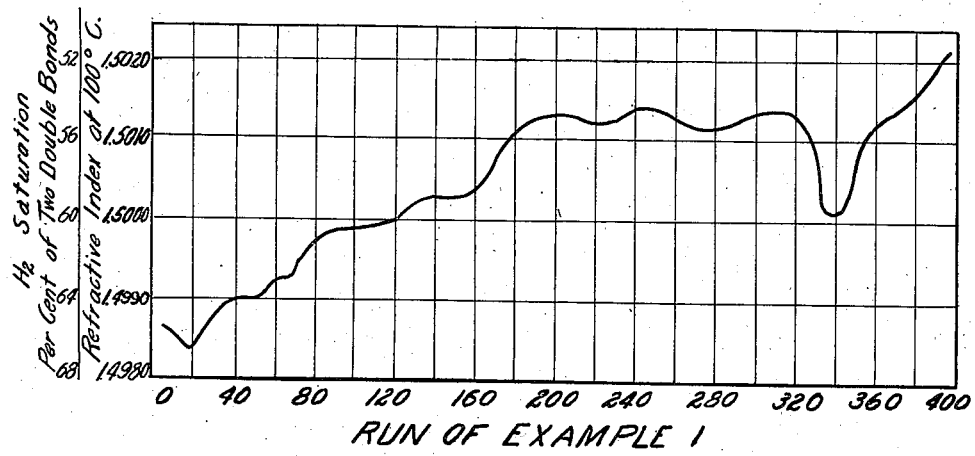

Nov. 13, 1945.   J. DREW   2,388,959
REGENERATION OF NICKEL ALLOY CATALYSTS
Filed Oct. 24, 1941

RUN OF EXAMPLE 1

RUN OF EXAMPLE 2

John Drew
INVENTOR.

BY *Cleveland B. Hallabaugh*
ATTORNEY

Patented Nov. 13, 1945

2,388,959

UNITED STATES PATENT OFFICE 2,388,959

REGENERATION OF NICKEL ALLOY CATALYSTS

John Drew, Hattiesburg, Miss., assignor to Hercules Powder Company, Wilmington, Del., a corporation of Delaware Application October 24, 1941, Serial No. 416,320

9 Claims. (Cl. 252—237)

The present invention relates to a method for the regeneration of "spent" hydrogenation catalysts of the nickel-aluminum and nickel-silicon types.

Nickel-aluminum alloy and nickel-silicon alloy hydrogenation catalysts may be prepared in accordance with U. S. Patents 1,563,587; 1,628,190 and 1,915,473 granted to Murray Raney. These catalysts have proven of excellent value in the hydrogenation of many substances, as rosin, rosin compounds, oils, fats, waxes, etc. However, with use, this type of catalyst becomes inefficient and drastic conditions of temperature and pressure or long periods of contact of the catalyst with the unsaturated material are required. Any attempts to regenerate such a "spent" catalyst along the lines suggested for the activation of a freshly-prepared catalyst employing the procedures of the aforesaid patents have not been successful to any substantial degree. Although the regenerated catalyst may show an increased activity as compared with the "spent" catalyst, the life span of the former is always much shorter than that of a freshly-prepared catalyst, and its activity highly unpredictable.

It is an object of this invention to provide a method for the regeneration of a "spent" hydrogenation catalyst of the nickel-aluminum or nickel-silicon alloy type.

It is an object of this invention to provide a method for the regeneration of a "spent" hydrogenation catalyst of the nickel-aluminum or nickel-silicon alloy type such that the regenerated catalyst will have substantially the same initial activity as a freshy-prepared, activated catalyst, and in addition will have at least the same life span as a freshly-prepared, activated catalyst.

It is a further object to provide a regenerated hydrogenation catalyst of the nickel-aluminum or nickel-silicon alloy type which is as efficient as a freshly-prepared, activated catalyst in that the former will have at least as high activity during its life span as has a freshly-prepared, activated catalyst.

Another object is to provide a regenerated hydrogenation catalyst of the nickel-aluminum or nickel-silicon alloy type which will show less loss during activation as compared with a freshly-prepared, activated catalyst, the activation being carried out by methods known and used in the art.

Other objects of the invention will be apparent to those skilled in the art upon consideration of the descriptive and illustrative embodiments to follow.

In accordance with the broad concept of this invention, a "spent" hydrogenation catalyst of the nickel-aluminum or nickel-silicon alloy type is subjected to a heat-treatment at a temperature between about 500° F. and a temperature just below the melting point of the "spent" catalyst, preferably between about 600° F. and about 700° F., for a time sufficiently long to accomplish decomposition of poisons adhering to the catalyst surfaces. What actually takes place during this heat-treatment is not precisely known. The decomposition products formed as a consequence of the heat-treatment are removed from the heat-treated catalyst. This removal may be accomplished by alternative means, the more preferred means being blowing with a gas which is inert to the catalyst at the temperature employed, such as, superheated steam, hydrogen, carbon dioxide, nitrogen, etc. Another means of removal involves treating the catalyst, after it has cooled to a suitable temperature, with an organic solvent in which the decomposition products are soluble. In this manner a product is ultimately obtained which is substantially free of catalyst poisons and decomposition products thereof, and which has a much higher activity than the "spent" catalyst. Although this treated catalyst may be employed as a hydrogenation catalyst without further treatment, it is much preferred to subject the treated catalyst to a further treatment comprising activation by any of the methods now known and used in the art for the nickel-silicon or nickel-aluminum type catalyst.

The processes of the invention will be of particular significance in connection with hydrogenation catalysts of the so-called lump type employed in continuous phase hydrogenation such as described in U. S. Patent 1,915,473 to Murray Raney wherein the aluminum or silicon of the original alloy is not completely removed as a result of an activation process with say sodium hydroxide. In other words the cores of the particles of activated catalyst consist of the alloy unchanged by the activation process. There is no critical limitation as to the particle size to which the alloy must be crushed prior to activation. For the hydrogenation of rosin and other abietyl compounds, the alloy is desirably broken into particles of a size that will pass through a ½" mesh and be retained on a 10 mesh screen. For convenience hereinafter in this specification, the term "nickel alloy catalyst" will be employed to indicate a catalyst of either the nickel-silicon or nickel-aluminum variety.

In the heat-treatment step of the invention, the particular temperature which will give most satisfactory results will depend to some extent upon the previous history of the "spent" catalyst. For example, it has been found that when the catalyst has been employed in the hydrogenation of rosin or a rosin compound, the particular temperature giving optimum results is between about 600° F. and about 700° F., preferably about 650° F. As desired, the heat-treatment may be carried out with the catalyst in contact with the material for which it was previously employed to hydrogenate, or with the catalyst substantially free of said material. Thus, in the case where the catalyst has become spent in the hydrogenation of rosin, the heat-treatment may be applied to the catalyst itself or the catalyst in the presence of rosin. Not only may the heat-treatment be employed with the catalyst in contact with the material for which it was previously employed to hydrogenate, but certain other materials may be utilized. Thus, where the catalyst was previously used in rosin hydrogenation, the so-called "light ends" resulting from the process may be employed. The "light ends" is an oily material which results as a consequence of the decomposition of the rosin when heated to the high temperature required when a nickel alloy catalyst is used. The period of heat-treatment will be such that substantially all of the catalyst poisons are decomposed. Generally, this period will vary between about 5 minutes and about 6 hours, the preferred period being between about 1 hour and about 4 hours.

Following the period of heat-treatment, the catalyst will be treated to remove the decomposition products formed in the heat-treatment. The preferred procedure is to blow the catalyst with a gas which is inert to the catalyst at the temperature employed. The most satisfactory inert gases have been found to comprise superheated steam, hydrogen, carbon dioxide and nitrogen, with superheated steam giving particularly good results. During the blowing operation, the temperature of the gas and the temperature of the catalyst will be maintained within the ranges disclosed above for the heat-treatment. The period of the blowing step will vary depending on the temperature employed, etc., however, generally, between about 10 minutes and about 6 hours will be sufficient, the preferred period varying between about 1 hour and about 3 hours.

Now, in accordance with the invention, the removal of the decomposition products may alternatively be accomplished by employing a solvent therefor. It has been found that generally any organic solvent which acts as a solvent for the particular material which was being hydrogenated by the catalyst before it reached its "spent" condition will be satisfactory. Hence, in the case of rosin, alcohols, as methyl alcohol, ethyl alcohol, etc., aromatic hydrocarbons, as benzene, toluene, xylene, etc., ketones, as acetone, etc., ethers, as diethyl ether, etc., chlorinated hydrocarbons, as carbon tetrachloride, etc., acids, as acetic acid, etc., terpenes, as, turpentine, α-pinene, etc. may be employed.

It is possible where the removal of the decomposition products is being accomplished by means of an inert gas to simultaneously blow the catalyst while it is being heat-treated. In this event the conditions as applied to the heat-treatment hereinbefore discussed will apply, the additive feature being that the inert gas is passed through the catalyst in a suitable manner. The temperature of the inert gas will be substantially the same as that of the heated catalyst.

In accordance with the preferred procedures of this invention, the catalyst, after treatment by the processes hereinabove described, will be subjected to one of the several activation processes which are customarily applied to a freshly-prepared nickel alloy hydrogenation catalyst, as described in the previously mentioned Raney patents. However, the catalysts after treatment as described above may be employed without first subjecting them to said activation processes. These catalysts will be found to possess greatly increased activity as compared with the same catalysts in their "spent" condition. They may be employed successfully in the hydrogenation of any desired material, however, the life spans of these catalysts will generally be found to be shorter than is normal for a freshly-prepared, activated nickel alloy hydrogenation catalyst.

The processes referred to immediately supra which are normally applied to activate a freshly-prepared nickel alloy catalyst and which will preferably be employed as the final step in the process of regeneration in accordance with this invention are as follows:

(1) Treatment with hydrogen, preferably in the presence of moisture. Preferably, a temperature and a pressure above normal atmospheric will be employed.

(2) Treatment with a sodium hydroxide solution.

(3) Treatment with a sodium hydroxide solution, followed by treatment with hydrogen either with or without moisture present.

(4) Treatment with sodium carbonate solution, preferably at boiling temperature.

(5) Treatment with sodium carbonate solution, preferably at boiling temperature, followed by treatment with hydrogen either with or without moisture present.

(6) Treatment with water. The water may be unheated, heated, in the form of steam under normal or superatmospheric pressure, or water which has had its boiling point raised by the addition of sugar, salts and other water-soluble compounds.

The preferred method of activation of those enumerated is (2). Furthermore, it has been found most desirable to carry out the activation with sodium hydroxide solution at an elevated temperature, most preferably at a temperature between 200° F. and the boiling point of the solution. Regardless of what method of activation is employed, the resulting activated catalyst will, desirably, be treated to remove any water it may contain prior to use in hydrogenation. This may be accomplished by any suitable method, as treatment with acetone, etc.

There follow several examples which illustrate several ways in which the principles of this invention have been demonstrated but they are not to be taken as exclusive or limiting in any way.

*Example 1*

A unit was built consisting of a 30" length of 3" standard black iron pipe with flanged heads, the top of which had an inlet for inert gas with a vent valve and the top of which contained a valved opening. It was heated with three 500 watt heaters, connected so as to give three heats and was well-lagged. Ten pounds of "spent" lump nickel-aluminum alloy hydrogenation catalyst which had reached its "spent" condition as a result of the hydrogenation of wood rosin was charged into this unit. This catalyst was originally prepared from an alloy consisting of 42% nickel and 58% aluminum. In its "spent" condition it would no longer produce a rosin having a hydrogen saturation of at least 55.5% of the double bonds under operating conditions. The temperature within the unit was raised to 650° F., and a temperature between 650° F. and 670° F. was maintained for 2 hours. Then, superheated steam at 650° F. was passed through the unit for 2 additional hours. Finally, the charge was dropped, while hot, into water at atmospheric temperature. The catalyst was washed with water, cleaned with acetone and dried. In this condition, it had a much higher activity than in its "spent" condition.

To restore this catalyst to optimum activity it was activated by contacting with an aqueous 16% NaOH solution at 200 to 212° F. for 25 minutes. This was followed by a 5-minute wash with aqueous 16% NaOH solution. After being washed with water, the catalyst was dried by heating in an atmosphere of hydrogen.

This resulting regenerated catalyst was employed to hydrogenate N wood rosin in a continuous hydrogenation test unit as follows. The continuous test unit was one having two reactors of equal size which were charged with catalyst during the hydrogenation operation. The reactors were so arranged that the rosin feed traveled from reactor I to reactor II in series. The rate of feed of the rosin was 13 lbs. per hour. The temperature in reactor I was maintained at 440° F. to 450° F., that in reactor II was 460° F. to 470° F. The unit was operated under these conditions as long as a product having a refractive index of about 1.5013 or lower at 100° C. could be obtained. This refractive index corresponds with the production of a hydrogenated rosin having a percentage saturation of the double bonds of 55.5%. As will be noted in the accompanying drawing, there were times when a somewhat higher refractive index was obtained. However, this condition existed only momentarily and generally the refractive index of the product was about 1.5013 or thereunder. Generally, throughout the reaction the pressure was maintained at 5000 to 6000 lbs. per sq. in.

In carrying out this example, reactor I was charged with a partially "spent" lump nickel-aluminum hydrogenation catalyst which had been employed in a previous run in which wood rosin was hydrogenated. In this previous run, reactor I was reactor II and at the outset of said previous run was charged with freshly-prepared, activated lump nickel-aluminum hydrogenation catalyst. Reactor II of the present example was charged with the regenerated catalyst prepared in accordance with this example. The results are indicated graphically by Fig. 1 in the accompanying drawing.

Example 2

Figure 2:
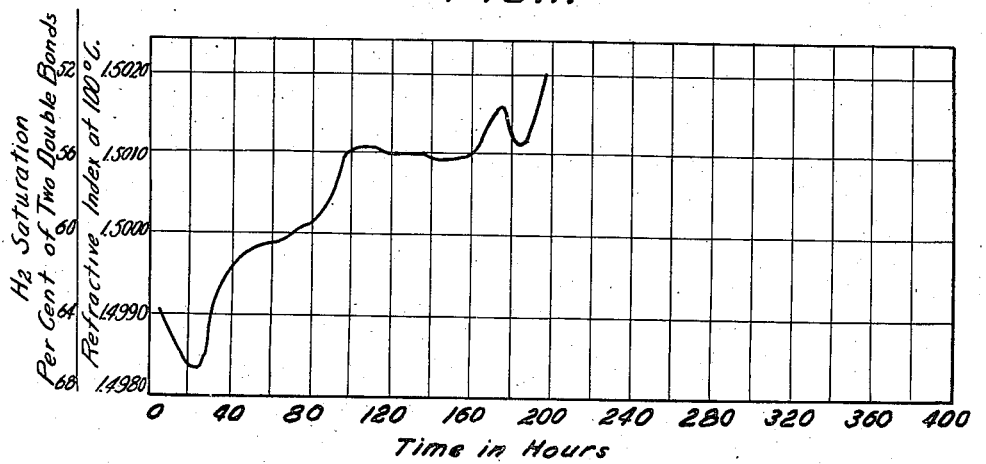

For purposes of comparison, the following run was made to illustrate the use of freshly-prepared, activated lump nickel-aluminum hydrogenation catalyst. This catalyst was prepared from an alloy containing 42% nickel and 58% aluminum and was activated with an aqueous 16% NaOH solution. In the run of the present example, reactor I was charged with a partially "spent" lump nickel-aluminum hydrogenation catalyst which had been employed in a previous run in which wood rosin was hydrogenated, i. e., the catalyst in reactor I was in similar condition to the catalyst in reactor I as employed in Example 1. Reactor II of the present example contained freshly-prepared, activated lump nickel-aluminum hydrogenation catalyst. The operating conditions of Example 1 were duplicated with the results given graphically in Figure 2 of the attached drawing.

Example 3

The regeneration unit was charged again with 10 lbs. of "spent" lump nickel-aluminum hydrogenation catalyst of the same type as that employed in Example 1. Sufficient N wood rosin was added so that upon heating the catalyst was covered with rosin. A temperature of 600° F. to 650° F. was then maintained within the unit for 1 hour and 40 minutes. The rosin was removed thereafter, and the catalyst subjected to superheated steam at 675° F. for 5 hours. The catalyst was cooled in steam, finally to room temperature and then dried. The resulting catalyst had a much improved activity as compared with the same catalyst in its "spent" condition. Upon its activation with aqueous 16% NaOH solution it was restored in activity to that possessed by a freshly-prepared activated catalyst. It also had substantially the same life span as that of a freshly-prepared activated catalyst.

Example 4

Ten pounds of "spent" catalyst of the type used in Example 1 were charged into the regeneration unit, and the temperature therein maintained at 650° F. to 700° F. for 2 hours. The catalyst mass was then blown with $CO_2$ at 650° F. to 700° F. for 3 hours. The catalyst was then allowed to cool to room temperature and was discharged from the unit. The resulting catalyst had a much improved activity as compared with the same catalyst in its "spent" condition. Upon its activation with aqueous 16% NaOH solution it was restored in activity to that possessed by a freshly-prepared activated catalyst. It also had substantially the same life span as a freshly-prepared activated catalyst.

Example 5

Ten pounds of "spent" catalyst of the type used in Example 1 were charged into the regeneration unit and a temperature of 650° F. to 700° F. was maintained therein for a period of 2 hours. The catalyst was then blown with $N_2$ at a temperature of 650° F. to 700° F. for 3 hours. After the catalyst had cooled to room temperature, it was discharged. The resulting catalyst had a much improved activity as compared with the same catalyst in its "spent" condition. Upon its activation with aqueous 16% NaOH solution, it was restored in activity to that possessed by a freshly-prepared activated catalyst. It also had substantially the same life span as a freshly-prepared activated catalyst.

From a consideration of the foregoing examples, it will be evident that the present processes provide a highly advantageous method for the regeneration of "spent" lump nickel alloy hydrogenation catalysts. These regenerated catalysts have substantially the same initial activity and life spans as have freshly-prepared, activated catalysts. Actually, experimentation has shown that the life spans of these regenerated catalysts may be definitely longer than those of the freshly-prepared, activated catalysts. The run of Example 1, for illustration, was of greater length than any run heretofore made using a freshly-prepared, activated catalyst under similar conditions.

The foregoing examples point out conclusively that the regenerated catalysts of the present invention have at least as high activities during their life spans as have freshly-prepared, activated nickel alloy catalysts. Hence, these regenerated catalysts are at least as efficient as the freshly-prepared, activated catalysts. It has been discovered, too, that the regenerated catalysts of this invention show less loss on activation than do freshly-prepared catalysts. For example, it took only 23 lbs. of regenerated catalyst (before activation) in Example 1 to fill one of the reactors of the hydrogenation test unit. Normally, using freshly-prepared alloy, about 30 lbs. are required.

It will be realized that, wherever in this specification and claims the percentage hydrogen saturation of the double bonds of rosin is referred to, there is contemplated a calculation on the assumption that rosin consists entirely of resin acids having a molecular weight of 302 and having 2 double bonds per molecule.

It will be realized that the term "regeneration" as applied herein refers broadly to the subjection of a "spent" catalyst to the processes of this invention which may or may not include what is technically known as "activation" as described in the Raney patents referred to hereinbefore. Wherever "activation" is used herein, it will be used in this technical sense.

What I claim and desire to protect by Letters Patent is:

1. A process for the regeneration of a "spent" lump hydrogenation catalyst comprising essentially a material selected from the group consisting of nickel-aluminum and nickel-silicon alloys which process comprises heating the catalyst, in contact with the material for which the catalyst was previously employed to hydrogenate, at a temperature between about 500° F. and a temperature below the melting point of the catalyst, removing said material by any desirable means, and thereafter blowing through the catalyst at a temperature within the aforesaid range a gas which is inert to the catalyst at the temperature employed.

2. A process for the regeneration of a "spent" lump hydrogenation catalyst comprising essentially a material selected from the group consisting of nickel-aluminum and nickel-silicon alloys which process comprises heating the catalyst in contact with rosin at a temperature between about 500° F. and a temperature below the melting point of the catalyst, removing said rosin, and thereafter blowing through the catalyst at a temperature within the aforesaid range a gas which is inert to the catalyst at the temperature employed.

3. A process for the regeneration of a "spent" lump hydrogenation catalyst comprising essentially a material selected from the group consisting of nickel-aluminum and nickel-silicon alloys which process comprises heating the catalyst in contact with "light ends" resulting from the hydrogenation of rosin at a temperature between about 500° F. and a temperature below the melting point of the catalyst, removing said "light ends," and thereafter blowing through the catalyst at a temperature within the aforesaid range a gas which is inert to the catalyst at the temperature employed.

4. A process for the regeneration of a "spent" lump hydrogenation catalyst comprising essentially a material selected from the group consisting of nickel-aluminum and nickel-silicon alloys which process comprises heating the catalyst, in contact with a material selected from the group consisting of the material for which the catalyst was previously employed to hydrogenate and a material resulting from the hydrogenation, at a temperature between about 500° F. and a temperature below the melting point of the catalyst, removing said material by any desirable means, and thereafter blowing through the catalyst at a temperature within the aforesaid range a gas which is inert to the catalyst at the temperature employed.

5. A process for the regeneration of a "spent" lump hydrogenation catalyst comprising essentially a material selected from the group consisting of nickel-aluminum and nickel-silicon alloys which process comprises heating the catalyst, in contact with a material resulting from the hydrogenation, at a temperature between about 500° F. and a temperature below the melting point of the catalyst, removing said material by any desirable means, and thereafter blowing through the catalyst at a temperature within the aforesaid range a gas which is inert to the catalyst at the temperature employed.

6. A process for the regeneration of a "spent" lump hydrogenation catalyst comprising essentially a material selected from the group consisting of nickel-aluminum and nickel-silicon alloys which process comprises heating the catalyst, in contact with a material selected from the group consisting of the material for which the catalyst was previously employed to hydrogenate and a material resulting from the hydrogenation, at a temperature between about 600° F. and about 700° F., removing said material by any desirable means, and thereafter blowing through the catalyst at a temperature within the aforesaid range a gas which is inert to the catalyst at the temperature employed.

7. A process for the regeneration of a "spent" lump hydogenation catalyst comprising essentially a material selected from the group consisting of nickel-aluminum and nickel-silicon alloys which process comprises heating the catalyst in contact with rosin at a temperature between about 600° F. and about 700° F., removing said rosin, and thereafter blowing through the catalyst at a temperature within the aforesaid range a gas which is inert to the catalyst at the temperature employed.

8. A process for the regeneration of a "spent" lump hydrogenation catalyst comprising essentially a material selected from the group consisting of nickel-aluminum and nickel-silicon alloys which process comprises heating the catalyst in contact with rosin at a temperature of about 650° F., removing said rosin, and thereafter blowing superheated steam through the catalyst at the aforesaid temperature.

9. A process for the regeneration of a "spent" lump hydrogenation catalyst comprising essentially a material selected from the group consisting of nuickel-aluminum and nickel-silicon alloys which process comprises heating the catalyst, in contact with a material selected from the group consisting of the material for which the catalyst was previously employed to hydrogenate and a material resulting from the hydrogenation, at a temperature between about 500° F. and a temperature below the melting point of the catalyst, for a period between about five minutes and about six hours, removing said material by any desirable means, and thereafter blowing through the catalyst at a temperature within the aforesaid range a gas which is inert to the catalyst at the temperature employed.

JOHN DREW.